Jan. 12, 1954    M. MOONEY    2,665,864
PRELOADED RUBBER MOUNTING
Filed June 26, 1948    2 Sheets-Sheet 1

INVENTOR.
MELVIN MOONEY
BY
William R. Epes

Jan. 12, 1954

M. MOONEY 2,665,864

PRELOADED RUBBER MOUNTING

Filed June 26, 1948

INVENTOR.
MELVIN MOONEY
BY
William R. Eper

Patented Jan. 12, 1954

2,665,864

UNITED STATES PATENT OFFICE 2,665,864

PRELOADED RUBBER MOUNTING

Melvin Mooney, Mountain Lakes, N. J., assignor to United States Rubber Company, New York, N. Y., a corporation of New Jersey Application June 26, 1948, Serial No. 35,457

1 Claim. (Cl. 248—10)

This invention relates to improved vulcanized rubber mountings used to support vibrating machinery or to isolate delicate apparatus from vibrations originating elsewhere.

More particularly, this invention relates to rubber mountings packaged under stress whereby the inherent tendency of such mountings to drift and permit the supported load to sag out of alignment is reduced to a very small magnitude.

According to this invention, vulcanized rubber composition mountings are subjected to a strain in the same direction and at least to substantially the same extent as the rubber will be strained under normal service load; the rubber is maintained in said strained state until the tendency of the rubber to drift is reduced to a small magnitude compared to the initial rate of drift; and the mounting is subjected to its service load without permitting the rubber to become unstrained long enough to permit appreciable creep recovery to take place.

Heretofore, the rubber composition mountings used to support machinery or apparatus in vibration service have exhibited the phenomenon known as drift to such an extent that in spite of the inherent advantages of rubber mountings over steel springs, the rubber mountings could not be used advantageously in many applications. The drift of rubber in a motor mounting or other elastic rubber support may grow so large in the course of time that the part supported gets out of line with other parts in the system, or the dynamic properties of the support become considerably altered. This drift of rubber is defined as the slow yielding of rubber to a continuously applied load. Drift is distinguished from permanent set, which is the residual strain remaining after removal of an applied force. Thus, drift is measured while the force is acting; set is measured after the force is removed. The drift of rubber is more pronounced in the first few weeks of service than it is in the succeeding few years.

Heretofore attempts have been made to treat rubber mountings to eliminate drift so that the mountings would be capable of supporting their normal load at a relatively fixed position over long periods of time. For example, Merrill, in U. S. Patent 2,231,769, has suggested reducing the tendency of rubber to drift by subjecting the rubber to a load, heating while under load, cooling the rubber, and removing the load, whereby the rubber assumes a permanent set. In that case, the thermal treatment which is a necessary part of the process is inconvenient and adds to the expense of producing the mountings.

It is an object of this invention to provide an improved rubber mounting which exhibits substantially improved drift characteristics under a continuously applied load.

It is also an object of this invention to provide a rubber mounting of low drift characteristics which is packaged under stress at the factory and which can be installed in service by the consumer without any further treatment.

Further objects will be evident in the following detailed description of the invention.

Referring to the figures.

Before considering the method of practicing my invention and the advantages which flow therefrom in detail, certain fundamental facts concerning the phenomena of drift and recovery as exhibited by natural rubber will be considered. The synthetic rubbers which have now come into general use have very similar drift properties.

Figure 1:
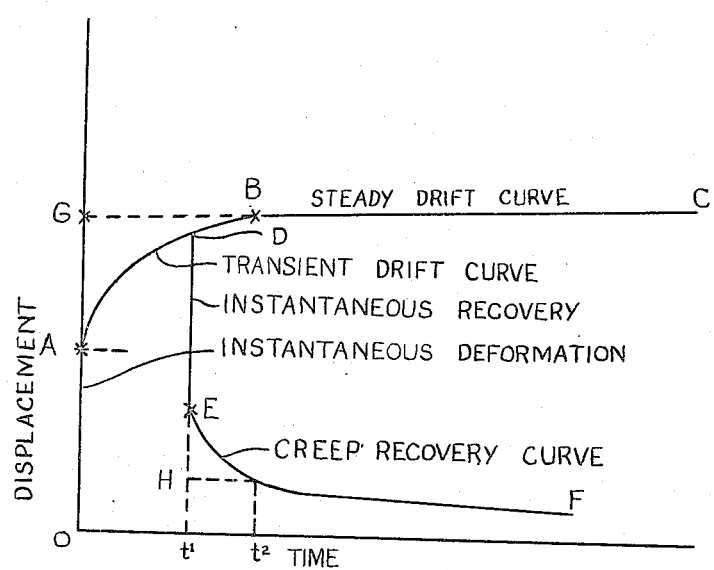
Figure 1 is a graphical representation of the displacement phenomena which take place when rubber is loaded, and when it is released.
Figure 3:
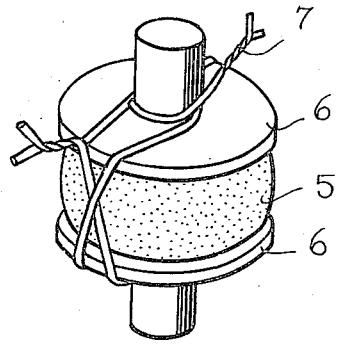
Figure 3 represents a prestrained rubber composition mounting packaged under compression, for use in compression service.

The drift and recovery behavior of rubber is represented graphically in Figure 1 in reference to rubber subjected to compression, as in Figure 3. However, the drift and recovery behavior of the rubber is similar whether it is subjected to tensile, compressive, shearing, or torsional stresses. For convenience in considering the behavior of the rubber it is assumed to be subjected to compressive stresses as represented graphically in Fig. 1. Thus, if a block of rubber between two horizontal plates is suddenly subjected to compression by a load placed on the top plate, there is an instantaneous elastic deformation, represented on the graph of Figure 1 by the distance O to A, followed by continued slow deformation, A to C, which is called drift. It is seen that the drift curve shows two regions: the first region, from A to B, exhibiting a high initial rate of drift which, however, rapidly decreases; and the region B to C, in which the rate of drift remains substantially constant but quite small. The rapid drift in the first region is called transient drift, and the slow drift in the second region is called steady drift. The point G is obtained by extending the steady drift line back to zero time. Such procedure of locating the point G is followed because transient drift also includes steady drift over the same period of time. The magnitude of the displacement which is due to transient drift alone is represented by the distance A to G. It is an object of this invention to reduce greatly this transient component of drift by a prestraining treatment. The rate of the steady component of drift is very small in comparison and is essentially a chemical phenomenon not reducible by prestraining treatment.

Considering the phenomena of recovery, it is observed that when a loaded sample which has been drifting for some time is released, the transient drift history is essentially reversed. This reverse process is known as creep recovery, as explained by H. Leaderman in his paper "Textile Materials and the Time Factor. I. Mechanical Behavior of Textile Fibers and Plastics" published in Textile Research, volume 11, pages 171–93 (February 1941). The general nature of the phenomenon is indicated by the curve DF in Figure 1, for a sample released at a time $t_1$ and recovering instantaneously from D to E.

Now, if the rubber is loaded again at $t_2$, and at this time the transient drift has not been completely reversed, that is, if EH is less than AG, the observed transient drift on loading the second time will be less than the transient drift which occurred on the first loading. The magnitude of the decrease in transient drift will be determined by the difference between the transient drift which took place on the first loading, and the creep recovery which took place during the release period, i. e., the difference between AG and EH. On the other hand, if the release period has been sufficiently long, the amount of creep recovery which takes place will be sufficient to reverse almost completely the transient drift which took place during the first loading, and the sample will, on second loading, exhibit substantially the same rate of transient drift which it exhibited on first loading.

An effect of the first loading and the subsequent drift is to predispose the rubber for a deformation in the same direction. This means that on the second loading, the sample appears to have a lower modulus, or, in other words, it undergoes a greater instantaneous elastic deformation. This increase in the instantaneous deformation is accompanied by a decrease in the subsequent transient drift.

The foregoing principles are embodied in my improved mounting.

To make my improved mounting the mounting is subjected to a prestrain, that is, the rubber is strained in the same direction and at least to the same extent as the rubber will be strained in service, and the rubber is retained in this strained condition until the tendency of the rubber to drift under load is reduced to a small magnitude compared to the initial rate of drift. The prestrained mounting is then subjected to its normal vibrational service without releasing the prestrain, or at least without releasing the prestrain for a period sufficiently long to permit appreciable creep recovery to take place.

It is an essential feature of my improved mounting that after the prestraining, and before use of the mounting in service, the rubber is not permitted to undergo appreciable creep recovery, which introduces into the rubber a renewed tendency to transient drift.

The straining or loading treatment by which I reduce drift may be carried out by applying to the rubber in the mounting a strain which is at least about as great as the strain to which the rubber will be subjected in the normal service for which it is designed, or by applying an overstrain, i. e., a strain equal to 2 or 3 times the normal strain to which the rubber will be subjected in normal service. Even greater overstrains may be employed, if desired, within the strength limits of the particular rubber composition used. As explained in more detail below, I prefer to carry out the loading treatment by packaging the mounting in the factory under a strain about equal to normal service strain, so that the prestraining takes place while the mounting is being stored or shipped, or is awaiting installation by the user.

The time for which the straining or loading treatment is carried out should be sufficient to reduce substantially the tendency of the rubber to drift. This reduction in tendency to drift corresponds to completion of a substantial part of the transient drift period as represented by the curve AB in Figure 1. As a practical matter, it is generally unnecessary to prolong the treatment to the extent that substantially all of the tendency to transient drift is removed, although this may be done if desired by a sufficiently prolonged treatment. For any particular application, it will generally be found that some substantial degree of reduction of transient drift, short of complete elimination of transient drift, will give satisfactory results. The time of treatment necessary to give the desired reduction in drift will depend, inter alia, on the characteristics of the particular rubber composition employed and the degree of strain applied, e. g., whether normal load strain or overstrain. As a guide, it may be stated that I usually apply the normal load strain to the rubber for a period of at least a week, and preferably longer, e. g. a month or two, or an overstrain for a period of at least a day, but the invention is not limited to these particular times.

After the completion of the straining treatment, the mounting must be installed in service under its normal vibrational load without permitting an appreciable release time, that is, without permitting appreciable creep recovery to take place, as otherwise the benefit of the prestraining treatment will be lost to the extent that such creep recovery takes place. This release time is preferably as short as possible, and, in fact, it is preferable that the mounting be installed in use without releasing the prestrain at all until completion of the installation. In many cases, a relatively short release time may be permissible, the length of which depends, inter alia, on the characteristics of the rubber composition employed, the degree and duration of the prestraining treatment, and the degree of reduction of drift desired. As a rule the maximum allowable release time during which creep recovery is permitted to take place is not greater than one hour, and is preferably less, e. g., 5 or 10 minutes or less. When it is not desired to use the mounted motor or other mounted device for a few days after installing the prestrained mounting, that is, when it is permissible for the mounted device to drift somewhat within the first few days, a comparatively longer release time after prestraining may be permitted to occur without deleterious effect. As a rule, it may be stated that the maximum release time which may be permitted will preferably be not more than one-tenth of the time for which the mounting was prestrained, or preferably not more than one-tenth of the time after installation of the mounting and use of the mounting in service (i. e. one-tenth of the time after installation during which appreciable drift is permissible), whichever time is smaller.

From the foregoing, it is evident that to realize the advantages of the invention, the release time, if any is permitted at all, will be as brief as is consistent with the character of the results desired under the circumstances of the particular case, as determined by preliminary experimentation.

Figure 2:
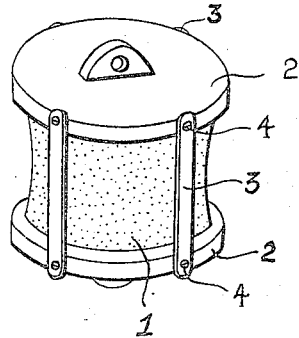
Figure 2 represents a prestrained rubber composition mounting packaged under tension, which is to be subjected to tensile stress in service.

An example of an improved mounting of my invention is illustrated in Figure 2, wherein 1 is a cylindrical rubber composition block to which a tensile strain has been applied equal to the tensile strain to which the mounting will be subjected in service. The rubber is suitably bonded to the metal plates 2, one of which may be attached to the load to be supported, and the other of which may be attached to a support. The rubber is maintained in tensile strain by the metal bars, or stiff members 3, which are attached to the mounting plates 2 by means of screws 4, and which maintain the mounting plates a predetermined distance apart. After the mounting is installed in service the screws 4 and the metal strips 3 are removed.

Another example of my invention is shown in Figure 3, wherein 5 represents a cylindrical block of rubber compressed between the circular plates 6 to which the rubber is suitably bonded and which are adapted to be attached to a load and a support. The rubber is maintained in a state of compression at least as great as the compression which will be applied by the normal service load by means of twisted wires 7. After this unit is installed the wires are removed by untwisting or cutting.

Figure 4:
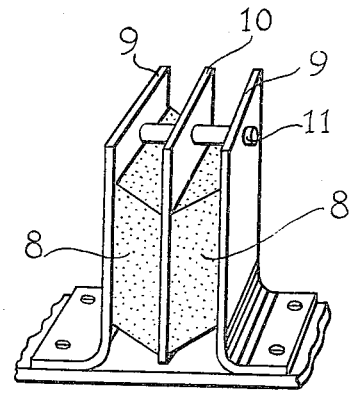
Figure 4 represents a prestrained rubber composition mounting packaged under shearing deformation.

A mounting designed to support a load through shearing deformation is shown in Figure 4. The rubber blocks 8 are adhered to steel plates 9 and 10. A shearing deformation at least as great as the shearing deformation to which the rubber composition will be subjected by the normal service load is maintained by the pin 11 passing through suitably arranged holes in the plates. The load is supported on the middle plate 10, and the pin is withdrawn after the unit is installed in service.

Figure 5:
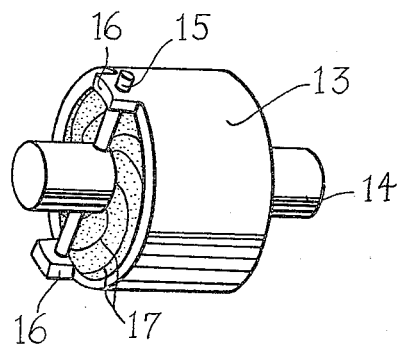
Figure 5 represents a prestrained rubber composition mounting packaged under torsional stress.

An example of my invention designed for loading in torsion is shown in Figure 5. The cylinder of rubber 12 is bonded to the outer metal cylinder 13 and the central metal shaft 14. The central shaft has been rotated counterclockwise as viewed from the left end, thereby producing torsional strains in the rubber at least as great as the torsional strains to which the rubber will be subjected in service. The shaft is held in this position by the pin 15 passing through a suitable hole in the shaft and a pair of lugs 16, on the outer cylinder. The torsional strains in the rubber composition are indicated by the flow lines 17. After the unit is installed, the pin is withdrawn.

It will be evident to those skilled in the art that the mounting unit employed to support a load at a desired height will be one which would support a load at too great a height if installed without any treatment. For example, if the height of the rubber in the simplified compression mounting illustrated in Figure 3 is equal to 100% before treatment, the height of the mounting after treatment and installation may typically be about 70%. The height of the treated mounting will vary with the particular treatment conditions employed, and with the characteristics of the rubber composition, as well as with the weight supported by the mounting.

As an example of the method of operation of my invention, a rubber mounting of the character illustrated in Figure 2 may be subjected in the factory to an elongation equal to the strain to which the mounting would be subjected in service, and maintained in this strained condition by the metal bars 3 for a period of seven days or more while the mounting is being shipped to the customer and awaiting installation in service. After installation of the mounting by the user and removal of the metal strips to permit the normal service load to be applied to the rubber, it will be observed that the drift of the mounting on the first day of service will be essentially nil. In contrast to this a comparable mounting treated according to a prior art method by preloading the rubber for a relatively short period of time at an elevated temperature and then cooling and releasing the mounting a substantial period of time before installation, will generally be found to exhibit a drift of at least several percent and frequently more on the first day. The drift is expressed as relative drift, i. e., as the percent increase in elongation after a given interval of time, based on the initial elongation produced by the normal service load. The drift exhibited by the mounting treated according to the method of this invention will continue to be very small compared to the drift exhibited by the conventionally treated mounting over the first few weeks of service, and even after extended periods of service such as 1000 days or more, the drift of the mounting of this invention will be typically only about half of the drift of the prior art mounting.

In another embodiment of my invention, I employ an overloading treatment, that is, I apply a strain to the mounting in excess of the normal strain, e. g., a strain equal to 200 or 300% of normal strain to which the mounting will be subjected in service. This overstrain is most conveniently applied while the mounting is installed in normal service position, but before using the supported device in service conditions. The mounting may also be over-strained in the packaging treatment, but it is not desirable to permit the mounting to remain in the over-strained condition for a long period of time. The period of time for which the overstrain is applied may be proportionally less than the period of time for which a prestrain equal to the strain under normal load would be applied; e. g., an overstrain of 200% of normal strain may be applied for a period of one day. Longer overstraining periods, e. g., one week, or greater overstrains within the strength limits of the rubber may be employed if desired, but as a rule they are not necessary.

As an example of this method, a compression mounting is installed in service position without any pretreatment, and the mounting is subjected to an overload or overstrain of 200% of normal load for one day before using the supported device in service conditions. This overstraining may be conveniently produced by suitable clamps adapted to move the supported and supporting members with respect to each other to produce the desired deformation. After the clamps are removed the unit then supports the normal load. By this treatment, the tendency of the mounting to drift under normal load, particularly during the initial period of service, is reduced to a very small magnitude. The degree of improvement in drift characteristics obtained by this method, in comparison with the prior art methods, is similar to the improvement obtained by prestraining at a strain equal to the normal service strain as set forth in detail above.

From the foregoing, it is seen that my invention gives superior results compared to known rubber mountings. My mounting is capable of giving consistently improved results, in contrast to known mountings which give variable and unpredictable results, due to the unloaded interval between the predrifting step and installation. My highly effective prestraining treatment requires no heating of the rubber or other inconvenient processing, and with my mountings packaged under strain, the prestraining can be carried out while the mounting is being shipped to the consumer or awaiting installation. My mounting can be installed by the user in the conventional way without any special treatments and because of the excellent degree of reduction in drift obtained, the dynamic properties of the support remain substantially the same for extended service periods.

As the drift behavior of synthetic rubber is substantially of the same nature as that of natural rubber, it is intended that reference to rubber, or rubber composition, shall be considered in its broad terminology as including synthetic rubber compositions, e. g., rubbery butadiene-styrene copolymers, Perbunan, butyl rubber, etc.

While a preferred embodiment of the invention has been shown and described, it is to be understood that it is susceptible to those modifications which reasonably appear within the scope of the appended claim.

Having thus described my invention, what I claim and desire to protect by Letters Patent is:

A pre-loaded rubber and metal shear-type mounting for resiliently supporting a definite service load with respect to a relatively fixed support, comprising a central flat metal plate, rectangular blocks of vulcanized rubber composition bonded to opposite faces of the metal plate, outer flat metal plates bonded to the outer face of each of said blocks of vulcanized rubber compound, said plates being adapted to be attached to a load and to a supporting member, said central plate being displaced with respect to said outer plates by an amount sufficient to place the said rubber blocks in a state of simple shearing deformation at least as great as the shearing deformation to which the rubber will be subjected under its normal service load, said plates having holes disposed in alignment when said plates are so displaced, and a retaining pin passing through said aligned holes in the plates to maintain the said blocks in said state of shearing deformation.

MELVIN MOONEY.

References Cited in the file of this patent

UNITED STATES PATENTS

| Number | Name | Date |
|---|---|---|
| 1,358,878 | Rinn, Jr. | Nov. 16, 1920 |
| 2,231,769 | Merrill | Feb. 11, 1941 |
| 2,327,113 | Krotz | Aug. 17, 1943 |
| 2,444,904 | Worley | July 6, 1948 |
| 2,531,059 | Krotz | Nov. 21, 1950 |